UNITED STATES PATENT OFFICE.

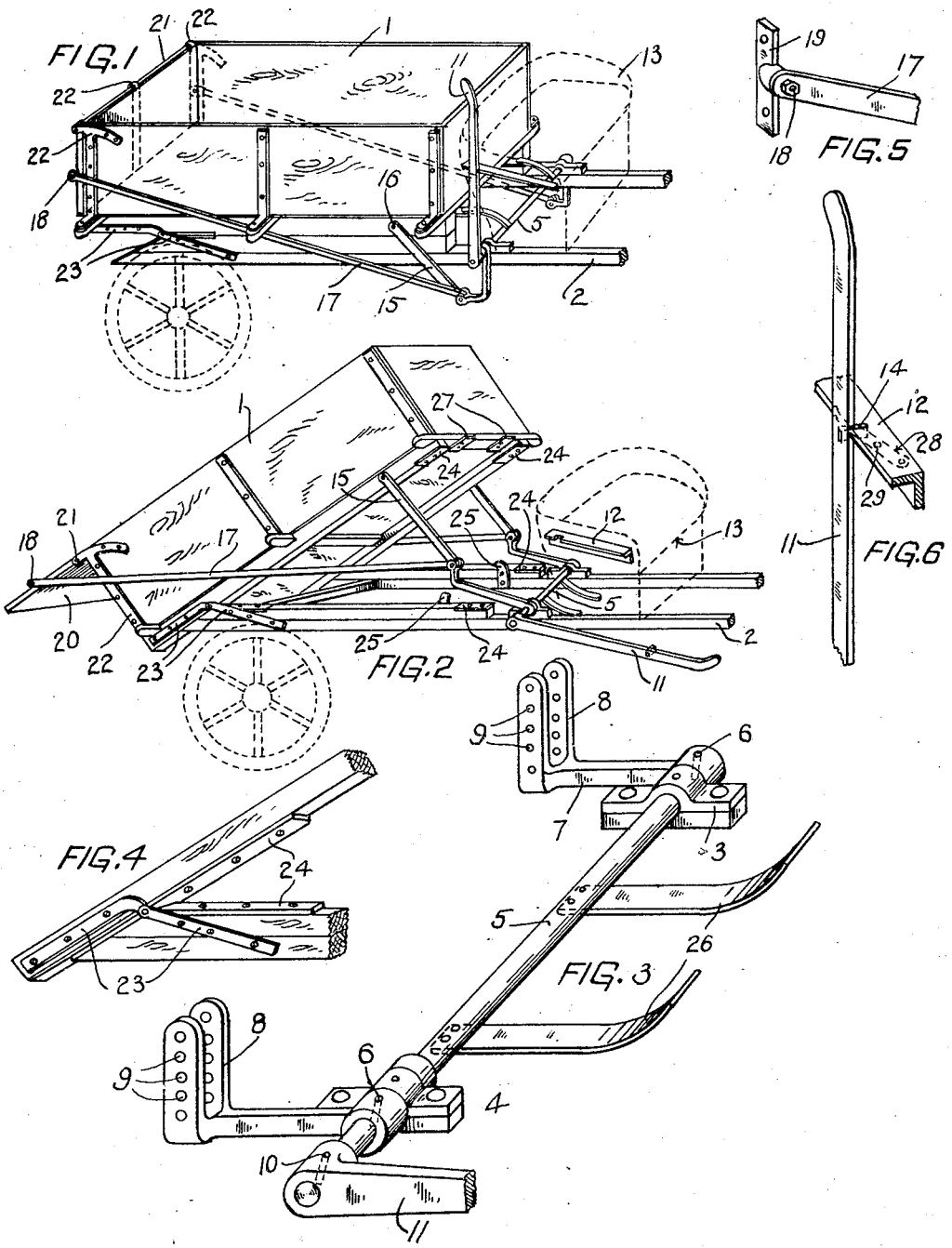

WILLIAM CHARLES GILMORE, OF WOLLONGONG, NEW SOUTH WALES, AUSTRALIA.

TILTING MECHANISM.

Application filed June 4, 1924, Serial No. 717,882, and in Australia August 7, 1923.

This invention relates to means which are attachable to the chassis or frame of a motor road or like vehicle and to the body thereof whereby the contents carried by the body may be readily tipped therefrom and the body returned to normal position on the vehicle chassis or frame when required.

Located rearwardly of the seat of the driver of the vehicle on opposite sides of the chassis or frame thereof are a pair of bearings for a rotatable shaft. Such bearings are preferably constructed to permit the shaft to be adjustable therein. Suitably fixed to said shaft at opposite ends thereof are a pair of levers and on one end of the shaft is fixed an operating lever, the latter being capable of either being turned downwardly to rotate the shaft in one direction or to be turned upwardly to rotate the shaft in the opposite direction and whilst in its upward position to be brought into engagement with a toothed rack located on the side of the box of the driver's seat to be detachably held thereby in locked position.

Each of the levers on the shaft is preferably furnished with a jawed outer end adapted to be pivoted to one end of the lever which may, if desired, be bent at its lower end and whose upper end is pivoted to the forward part of the tilting body of the vehicle. The said bent levers are pivoted at their upper ends to the opposite sides of the said body. Also pivotally attached to the jawed end of the levers affixed to the rotatable shaft are the forward ends of two long levers; the rear ends of the latter levers extend from the jawed levers to the rear of the body of the vehicle and are disposed at either side thereof. The rear ends of the long levers are pivotally attached to the tail door of the body of the vehicle. Such tail door is pivotally hinged to brackets at both sides of the body.

Jointed hinge members are also provided at the sides of the tilting body of the vehicle and the chassis or frame thereof, and if required the latter and the bottom of the tilting body are furnished with metal pieces which frictionally rub against each other during the tilting movements of the body.

Disposed near the forward part of the tilting body and secured to the chassis or frame of the vehicle are guide rods or bars adapted to guide the body in its tilting movements.

Referring to the accompanying drawings, Fig. 1 is a detail view of part of a vehicle with tilting devices thereon; the body of the vehicle being in untilted position; Fig. 2 a view similar to Fig. 1 but showing the body in tilted position; Fig. 3 detail view of operating shaft; Fig. 4 detail view of hinge members for vehicle body and chassis; Fig. 5 detail view of pivotal connection on tail door of body; and Fig. 6 detail view of locking means for operating lever.

The body 1 of the vehicle may be of any usual construction; it is mounted on the chassis or frame 2. Such chassis carries at opposite sides the bearings 3 and 4 for the rotatable shaft 5, the latter extending transversely of the chassis. Fixed to the shaft 5 by the pins 6 or otherwise are the levers 7 whose outer ends are jawed at 8; the said jaws having therein, if required, a series of holes 9. At one end such shaft 5 has also fixed thereto by a pin 10 or otherwise an operating lever 11 which, when in upright position, may be made to lock engage with the rack bar 12 on one side of the driver's seat 13 of the vehicle, the lever 11 being provided wtih a finger 14 or other means for this purpose.

Pivotally attached at one end to the jaws 8 of the levers 7 are the levers 15 whose opposite ends are pivotally attached at 16 to the opposite sides of the forward part of the body 1. Also pivotally attached at one end to the jaws 8 of the levers 7 are the levers 17, the opposite ends of which are pivotally connected to bolts 18 extending from plates 19 attached by any suitable means to the tail door 20 of the vehicle. The holes 9 serve to enable the levers 15 to be attached to the levers 7 in different positions for the purpose of regulating the upward throw of the forward part of the body 1 depending on the point of connection of the levers 15 with the levers 7.

Said tail door 20 is hinged to the rear of the body 1 by the pintle rod 21 which is carried by brackets 22 secured in any suitable manner to the rear of the body of the vehicle. The body 1 is hingedly connected to the chassis 2 by the metal hinge connections 23 or the like situated at opposite sides of the vehicle towards the rear thereof. It is also preferred to fit the body 1 and chassis 2 with metal plates 24 to preserve the said body and chassis from wear in the tilting and return movements of the body in relation to the chassis. At the forward part of the chassis 1 and located at opposite sides thereof are preferably provided guide devices 25 which may consist of metal plates secured to the chassis and adapted to guide the body in its tilting movements upon the chassis.

Though not essential the shaft 5 may be fitted with arms 26 adapted when the body 1 is in untilted position on the chassis or frame 2 to engage lugs or projections 27 on the front of the body 1 whereby an additional safeguard is offered to the body from tilting backwardly whilst the lever 11 is in erect position. Further, if required, the rack 12 may have pivotally or otherwise suitably fitted thereto a stop plate 28 adapted when set against the finger 14 to prevent the latter from becoming disengaged from the slot or slots in the rack 12. The stop plate 28 may carry a pin 29 adapted to be set in an opening in the rack 12 to hold the plate 28 against the finger 14.

In operation, when it is desired to tilt the body 1 on the chassis 2 for the purpose of tipping the contents of such body it is only necessary for the driver of the vehicle to detach the operating lever 11 from engagement with the rack 12 and to depress the lever 11 whereby the shaft 5 will be rotated in one direction. Upon such rotation the levers 7, 15, and 17 are also operated and the tail door 20 is opened and the contents of the body 1 are thus tipped by gravity from the rear of the body. Upon returning the lever 11 to normal upright position the shaft 5 will be rotated in the opposite direction, consequently the body 1 will be returned to normal position on the chassis 2 of the vehicle as shown in Fig. 1, the levers 7, 15, and 17 and the tail door 20 being also shown in normal position in said figure.

What I claim as my invention and desire to secure by Letters Patent is:—

In a dumping body for vehicles, the combination with the main frame of a vehicle, a body hinged to the frame for upward swinging movement and an end gate hinged to the upper edge of the rear end of the body and also adapted for upward swinging movement, of bearings mounted on the frame forwardly of the body, a shaft journalled in the bearings, arms rigid with and normally projecting from the shaft and normally arranged in the vertical position, angularly disposed bifurcated jaws extending rearwardly from the outer ends of the arms, a pair of levers arranged between the bifurcated jaws and the forward portion of the body, a pair of elongated levers also pivoted between the bifurcated jaws and having the opposite ends pivoted to the end gate, a handle lever rigidly connected with one end of the shaft and normally arranged in substantially vertical position and adapted to be moved substantially to rock the shaft and to move rearwardly and upwardly so as to raise the body to a dumping position and simultaneously open and raise the end gate, and means for locking the handle lever so as to normally maintain the lever in a horizontal position.

In testimony whereof I hereunto affix my signature.

WILLIAM CHARLES GILMORE.